(12) United States Patent
Bartnick et al.

(10) Patent No.: US 8,584,708 B2
(45) Date of Patent: Nov. 19, 2013

(54) MULTI-PORT VARIABLE FLOW CONTROL VALVE WITH SINGLE ACTUATOR AND INTERFACE

(75) Inventors: Brian K. Bartnick, Ortonville, MI (US); Corry W Johnson, Orion Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 180 days.

(21) Appl. No.: 13/216,631

(22) Filed: Aug. 24, 2011

(65) Prior Publication Data

US 2013/0048084 A1 Feb. 28, 2013

(51) Int. Cl.
*F16K 31/02* (2006.01)
(52) U.S. Cl.
USPC ............................. 137/870; 137/883; 137/887
(58) Field of Classification Search
USPC .................................. 137/595, 870, 883, 887
See application file for complete search history.

(56) References Cited

U.S. PATENT DOCUMENTS

| 1,122,848 | A | | 12/1914 | Bloom | |
|---|---|---|---|---|---|
| 2,051,278 | A | * | 8/1936 | Svenson | ............................. 137/1 |
| 5,906,297 | A | * | 5/1999 | Cole | ............................. 222/134 |
| 2006/0137536 | A1 | * | 6/2006 | De Jong | ............................. 99/348 |

OTHER PUBLICATIONS

Generic variable flow control valve, believed in use at least since 2010.
Faucet Valve Insert having diagonally disposed O-ring and channel therefor of Moen Incorporated, North Olmstead, OH 44070. Believed on the market at least since 1990.
Generic Prior Art O-Rings and Channels Therefor. Known since at least before 2010.
U.S. Appl. No. 13/118,751, filed May 31, 2011; inventors: Brian K. Bartnick, Pablo Valencia, Jr., Corry W. Johnson, and Bill F. Tompkins.
U.S. Appl. No. 13/413,079, filed Mar. 6, 2011; inventors: Pablo Valencia, Jr. and Brian K. Bartnick.
U.S. Appl. No. 13/439,193, filed Apr. 4, 2012; inventors: Brian K. Bartnick and Jr., Corry W. Johnson.

* cited by examiner

*Primary Examiner* — John Rivell
*Assistant Examiner* — Reinaldo Sanchez-Medina

(57) ABSTRACT

A single actuator multi-port flow control valve composed of a plurality of generally cylindrically shaped port bodies rotatably mounted within a valve body. The port bodies are serially driven by a single actuator via a drive link system composed of a drive pin on the inferior side wall of a serial superior port body selectively abutting, during rotation, a driven tab on the superior side wall of its serially inferior port body. The position of each port body is known to an electronic controller which selectively actuates the actuator to set each port body angular position.

11 Claims, 7 Drawing Sheets

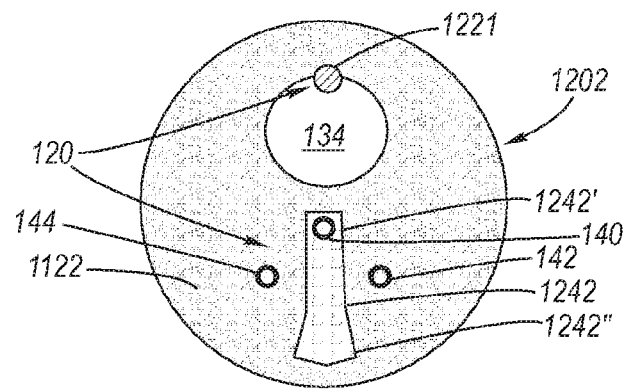
Fig. 5
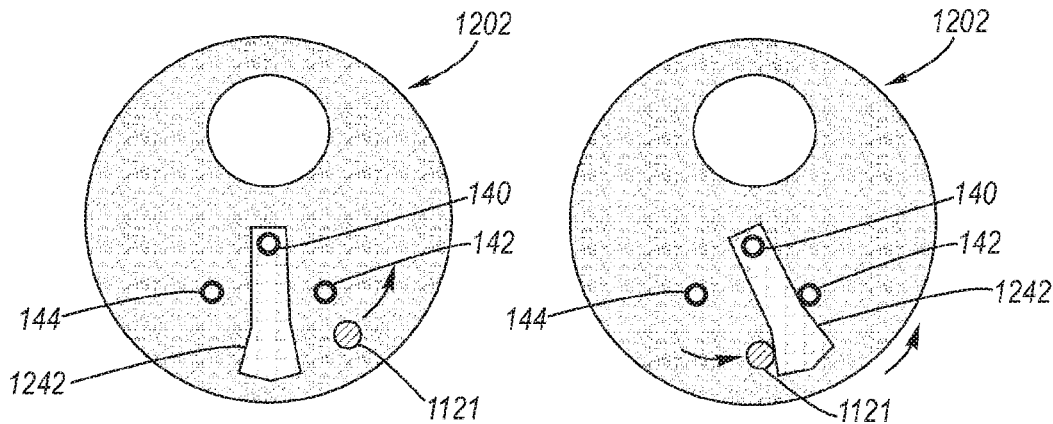
Fig. 6
Fig. 7
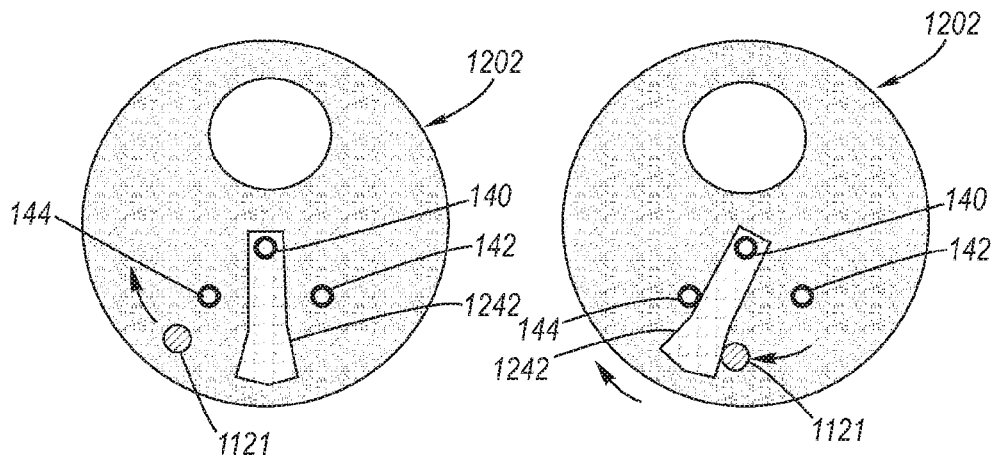
Fig. 8
Fig. 9

MULTI-PORT VARIABLE FLOW CONTROL VALVE WITH SINGLE ACTUATOR AND INTERFACE

TECHNICAL FIELD

The present invention relates to fluid flow control valving, and more particularly to a multi-port valve system in which each port is individually adjustable via a single actuator.

BACKGROUND OF THE INVENTION

Valves are used ubiquitously to control fluid flow of a fluidic flow system. For example, a motor vehicle coolant system utilizes a plurality of conduits connecting a plurality of components, including a radiator and a manifold, wherein the flow of the coolant is controlled by valving. Generally speaking, multi-port valves are well known, and each port thereof is independently adjusted by its own actuator.

By way of example, FIG. 1 depicts a prior art multi-port independently variable flow control valve system 10 composed of a first valve body 12 and a second valve body 12'. The first valve body 12 has a first inlet 14 and a first outlet 16, a first port body 20 having a first port opening 22, and a first actuator 28 for selectively rotating the first port body. The second valve body 12' has a second inlet 17 and a second outlet 18, a second port body 24 having a second port opening 26, and a second actuator 30 for selectively rotating the second port body In operation, an electronic controller 32 independently signals the first and second actuators 28, 30 to actuate in response to sensors 48 associated with a fluid flow system 54, as well as programming of the electronic controller. In this regard, the first actuator 28 rotates the first port body 20 independently of the second actuator 30 and the second port body 24; similarly, the second actuator 30 rotates the second port body 24 independently of the first actuator 28 and the first port body 20. The first actuator 28 rotates the first port body 20 so as to move the first port opening 22 in to and out of alignment with the first outlet 16, the first port body face 34 being sealed by seals 36. Similarly, the second actuator 30 rotates the second port body 24 so as to move the second port opening 26 in to and out of alignment with the second outlet 18, the second port body face 38 being sealed by seals 40. Port body O-ring seals 46, 46' are also provided at each port body in relation to the respective valve bodies 12, 12'. Each of the first and second port bodies 20, 24 has a through port 42 which may be provided anywhere suitable, as for example at a port body side wall 44, as shown at FIG. 2, but can be formed also on the port body face.

In order that the electronic controller knows the position of the first and second port openings with respect to the first and second outlets 16, 18, the first and second actuators 28, 30 may be stepper motors which provide rotational position feedback to the electronic controller, and/or valve port body position sensors 50, 52 may be provided for this purpose.

While known multi-port independently variable flow control valve systems work well, there is the deficiency that in order to independently control flow through each port opening, each port body must have its own separate actuator.

SUMMARY OF THE INVENTION

The present invention is a multi-port variable flow control valve actuated by a single actuator.

The single actuator multi-port flow control valve according to the present invention is composed of a plurality of generally cylindrically shaped port bodies rotatably mounted within a valve body, wherein each port body has an annular port body face and superior and inferior side walls on either side of the port body. The port body face has a port formed therein, wherein the port body face is sealingly interfaced in relation to a respective fluid flow opening in the valve body. The port bodies are serially driven by the single actuator via a drive link system composed of a drive pin on the inferior side wall of a serial superior port body selectively abutting, during rotation, a driven tab on the superior side wall of its serially inferior port body. The position of each port body is known to an electronic controller, for example via a respective position sensor, wherein the electronic controller actuates the actuator, which may be an electric motor, most preferably a stepper motor.

By way of example, a serially arranged set of port bodies is rotatably mounted within a valve body. The most superior port body, designated (for purposes of identification only) the first port body, is connected at its first port body superior side wall to the actuator, and has at its first port body inferior side wall a first port body drive pin. The serially next port body, designated the second port body, has at its second port body superior side wall a second port body driven tab which is selectively abuttable with the first port body drive pin during rotation of the first port body, and further has a second port body drive pin at its second port body inferior side wall. The serially next port body, designated the third port body, has at its third port body superior side wall a third port body driven tab which is selectively abuttable with the second port body drive pin during rotation of the second port body, and further has a third port body drive pin at its third port body inferior side wall. The serially last port body, designated the N port body, has at its N port body superior side wall an N port body driven tab which is selectively abuttable with an N−1 port body drive pin (the N−1 port body is the serially superior port body to the N port body, wherein the N−1 port body may or may not be the third port body in this example) during rotation of the N−1 port body, and does not have an N port body drive pin at its N port body inferior side wall (but may have, for example if for manufacturing purposes costs favor duplication of the port bodies). The number of port bodies, N, may be any number required for a particular fluid flow control application.

Operationally, the electronic controller receives sensory information of the fluidic system to which the single actuator multi-port variable flow control valve is interfaced and in response thereto and its programming, sets the flow position of each of the port bodies with respect to the valve body. Given there are N port bodies as described above, each port body is individually set to a fluid flow position with respect to the valve body by the single actuator, as for example by the following procedure.

The actuator rotates in a first direction N−1 complete rotations. This ensures that all port bodies are rotating in unison in the first direction, whereby each drive pin is in driving abutment with its respective driven tab. The actuator is then additionally rotated to set the requested angular position of the N port body. Next, the actuator is rotated in a second direction (necessarily being opposite to the first direction), N−2 complete rotations. This ensures that all port bodies except the N port body (which remains stationary) are rotating in unison in the second direction, whereby each drive pin is in abutment with its respective driven tab, excepting those of the N−1 port body interfaced with the N port body. The actuator is then additionally rotated to set the angular position of the N−1 port body to its requested angular position. This process is continued. When the angular position of the first port body is to be set, the first port body is rotated in a direction opposite to the direction that set the angular position of the second port body, whereby the first port body is rotated to the requested angular position (all other port bodies remaining stationary).

In accordance with the operational example above, N−1 turns of the most superior port body are needed to in order to cause turning of the most inferior port body. However, depending on the initial starting positions of the various port bodies, it is possible that less turning would be needed. For example, given the presence of a smart controller that knows the rotary position of each port body, then less rotation than N−1 turns of the most superior port body may be needed. Therefore, depending on the rotational position of the port bodies at an initial start, the rotation of the most superior port body is simply made sufficient to ensure rotation of all the port bodies occurs. Further, the rotation of the most superior port body may be less than N−1 turns because not all of the most inferior port bodies may require position adjustment.

It is preferred for the drive link system to provide a full 360 degrees of rotational freedom between serially adjacent port bodies; however the rotational freedom can be greater than or less than 360 degrees. In an application where the drive link system provides less than 360 degrees of rotational freedom, then the multi-port variable flow control valve system must have this rotational freedom constraint built into it.

Accordingly, it is an object of the present invention to provide a multi-port variable flow control valve actuated by a single actuator, wherein the single actuator serially sets the angular position of each port body thereof, the most inferior being set first and the most superior being set last via a series of alternate rotations.

This and additional objects, features and advantages of the present invention will become clearer from the following specification of a preferred embodiment.

BRIEF DESCRIPTION OF THE DRAWINGS

FIG. 5 is a sectional view, seen along line 5-5 of FIG. 4.

FIG. 6 is a sectional view similar to FIG. 5, showing a drive pin in an initial position with respect to a port body.

FIG. 7 is a sectional view as in FIG. 6, wherein the drive pin has rotated clockwise, whereat abutment with driven tab is such that any further rotation clockwise will result in the rotation of the port body.

FIG. 8 is a sectional view similar to FIG. 5, showing a drive pin in another initial position with respect to a port body.

FIG. 9 is a sectional view as in FIG. 6, wherein the drive pin has rotated counterclockwise, whereat abutment with driven tab is such that any further rotation counterclockwise will result in the rotation of the port body

DESCRIPTION OF THE PREFERRED EMBODIMENT

Figure 1:
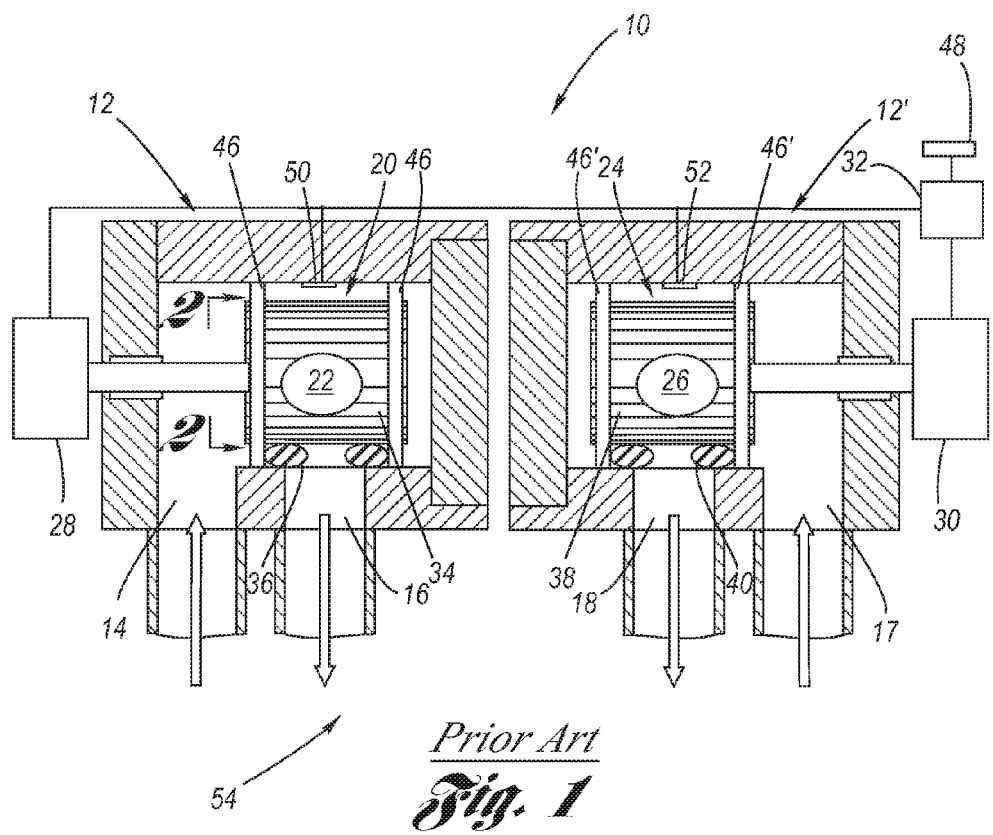
FIG. 1 is a partly sectional side view of a prior art multi-port independently variable flow control valve system.
Figure 2:
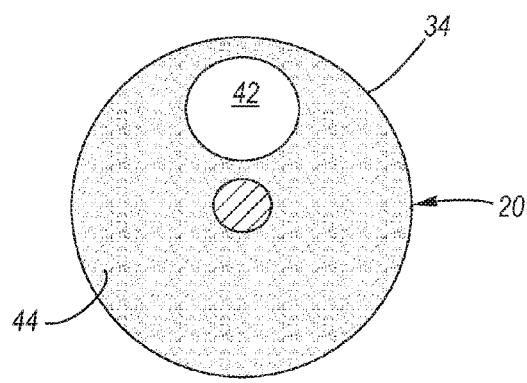
FIG. 2 is a side view of a port body seen along line 2-2 of FIG. 1.

Referring now to the Drawing, FIGS. 3 through 16 depict aspects of the single actuator multi-port variable flow control valve according to the present invention.

General aspects of a preferred structure and the resulting functionality thereof is depicted at FIGS. 3 through 9.

Figure 3:
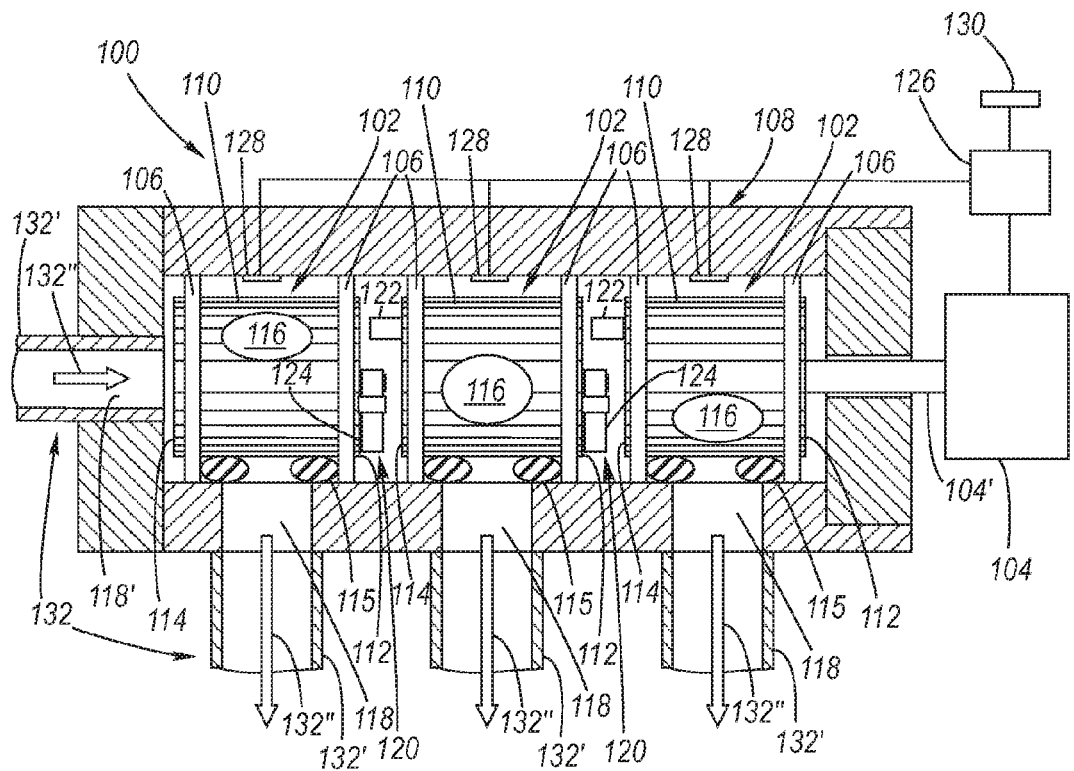
FIG. 3 is a partly sectional view of a single actuator multi-port variable flow control valve according to the present invention.

Referring firstly to FIG. 3, the single actuator multi-port flow control valve 100 according to the present invention is composed of a plurality of generally cylindrically shaped port bodies 102, rotatably mounted within a valve body 108, wherein each port body has an annular port body face 110 and superior and inferior side walls 112, 114 disposed on either side of the port body face. The port body face 110 has a port 116 formed therein, wherein the port of each port body may have its own respective shape and location of the port body face. The port body face 110 is sealed by seals 115 in relation to a respective fluid flow opening 118 (shown merely by way of examples as outlets) in the valve body 108, and by way of example an inlet opening 118' in the valve body is additionally provided. Port body O-ring seals 106 are also provided at each port body 102 in relation to the valve body 108.

The port bodies 102 are serially driven by a single actuator 104 connected by a shaft 104' to the superior side wall 112 of the serially most superior port body, and then serially to each other port body via a drive link system 120 composed of a drive pin 122 located on the inferior side wall 114 of a serial superior port body selectively abutting, during rotation, a driven tab 124 on the superior side wall 112 of its serially inferior port body. The position of each port body is known to an electronic controller 126, for example via a respective position sensor 128 of each port body, wherein the electronic controller actuates the single actuator, which may be an electric motor, most preferably a stepper motor. One or more fluid system sensors 130 provides data of the status of the fluid system 132 to which the single valve multi-port variable flow valve 100 is connected, wherein the fluid system is composed of conduits 132' and fluid 132". The data from the one or more fluid system sensors 130 is delivered to the electronic controller 126. Each of the port bodies 102 has a through port 134 which may be provided anywhere suitable, as for example at a port body inferior or superior side wall, as for example shown at FIG. 5, but can be formed also on the port body face.

Figure 4:
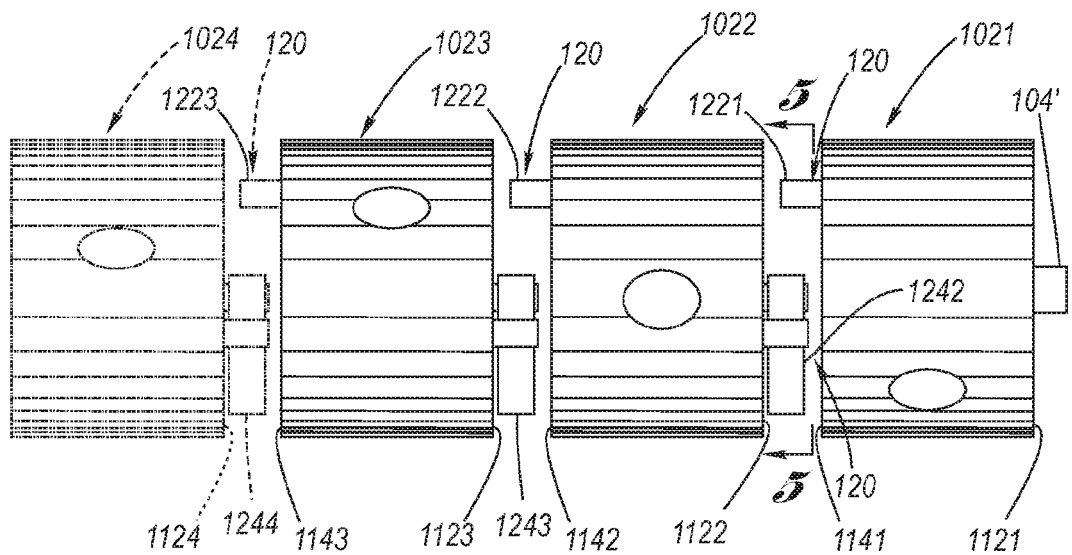
FIG. 4 is a detail side view of the series of port bodies of FIG. 3, detailing the serial drive link system.

By way of example in FIG. 4 the port bodies of FIG. 3 are shown detailed in serial arrangement to show more clearly the drive link system 120, it being understood that they are in fact rotatably mounted within the valve body 108 and driven by the single actuator 104 of FIG. 3.

The most superior port body, designated (for purposes of identification only) the first port body 102₁, is connected at its first port body superior side wall 112₁ to the actuator by the shaft 104', and has at its first port body inferior side wall 114₁ a first port body drive pin 122₁. The serially next port body, designated the second port body 102₂, has at its second port body superior side wall 112₂ a second port body driven tab 124₂ which is selectively abuttable with the first port body drive pin 122₁ during rotation of the first port body 102₁, and further has a second port body drive pin 122₂ at its second port body inferior side wall 114₂. The serially next port body, designated the third port body 1023, has at its third port body superior side wall 1123 a third port body driven tab 1243 which is selectively abuttable with the second port body drive pin 1222 during rotation of the second port body 1022.

In the example of FIGS. 3 and 4, the third port body 1023 is the last, most inferior port body, and so, would normally not have a drive pin at its third port body inferior side wall 1143, but would have a third port body drive pin 1123 if there is one or more serially inferior port bodies with respect to it. If there are additional port bodies, some number N port bodies in total, then the serially last port body, designated the N port body 1204, has at its N port body superior side wall 1124 an N port body driven tab 1244 which is selectively abuttable with an N−1 port body drive pin 1223 during rotation of the N−1 port body (the N−1 port body is the serially superior port body to the N port body, wherein the N−1 port body is, merely by way of the illustrated example of FIG. 4, the third port body). The serially most inferior port body, the N port body, would normally not have an N port body drive pin at its N port body inferior side wall (but may have, for example if for manufacturing purposes costs favor duplication of the port bodies). The number of port bodies, N, may be any number required for a particular fluid flow control application.

Referring now additionally to FIGS. 5 through 9, the structure and operation of a preferred form of drive link system 120 will be detailed.

Turning attention firstly to FIG. 5 for description of the structural aspects of the drive link system 120, the second port body driven tab 1242 is pivotally mounted at its proximal end 1242' to the second port body superior side wall 1122 via a tab pivot 140, whereby the distal end 1242", which is preferably, but not necessarily, flared, is pivotal about the tab pivot. The pivoting of the second port body driven tab 1242 is stopped in one pivot direction by a second port body right stop abutment 142, and in the other direction by a second port body left stop abutment 144.

Turning attention secondly to FIGS. 6 through 9, operational aspects of the drive link system will be described. The width of the distal end 1242" (including the flare, if any) of the second port body driven tab 1242 and the spacing between the second port body right and left stop abutments 142, 144 is such that the first port body 1021 can rotate clockwise and then counterclockwise (or counterclockwise and then clockwise at lease 360 degrees without causing rotation of the second port body. For a first example, consider the operational situation of FIGS. 6 and 7. The first port body 1021 is rotating counterclockwise, wherein the first port body drive pin 1121 must rotate from the position shown at FIG. 6 at least 360 degrees to the position shown at FIG. 7 whereat it abuts one side of the second port body driven tab 1242, while simultaneously the other side of the second port body driven tab abuts the second port body right stop abutment 142, whereupon now both the first and second port bodies 1201, 1202 rotate in unison counterclockwise. For a second example, consider the operational situation of FIGS. 8 and 9. The first port body 1021 is rotating clockwise, wherein the first port body drive pin 1121 must rotate from the position shown at FIG. 8 at least 360 degrees to the position shown at FIG. 9 whereat it abuts one side of the second port body driven tab 1242, while simultaneously the other side of the second port body driven tab abuts the second port body left stop abutment 144, whereupon now both the first and second port bodies 1201, 1202 rotate in unison clockwise. It is to be understood, therefore, that the drive link system 120 provides for a serially superior port body to selectively drive its serially inferior port body with a freedom of rotation of substantially 360 degrees between driving engagements therebetween.

Figure 10:
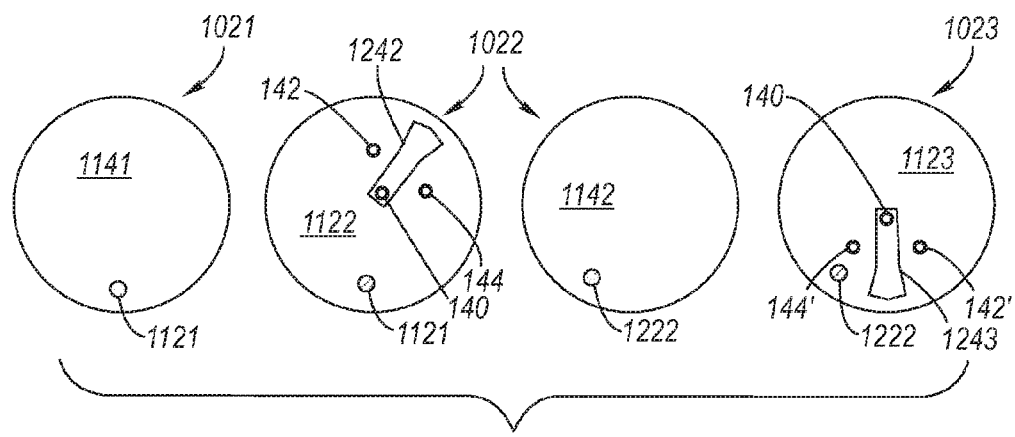
FIGS. 10 through 15 are a schematic end view representation of a series of three port bodies interfaced to a single actuator according to the serial drive link system of the present invention, wherein from left to right of the views are depicted: a first port body inferior side wall, a second port body superior side wall, the second port body inferior side wall, and a third port body superior side wall.

An illustration of operation with respect to the three port bodies 1021, 1022 and 1023 will now be described with reference being additionally made to FIGS. 10 through 15, wherein it is to be understood the number of port bodies can be more or less than three. In the various views of FIGS. 10 through 15, seen are, from left to right: the first port body inferior side wall 1141, the second port body superior side wall 1122, the second port body inferior side wall 1142, and the third port body superior side wall 1123. FIG. 10 illustrates an initial position of each of the port bodies 1021, 1022, 1023.

As shown at FIG. 3, the electronic controller 126 receives sensory information of the fluidic system 132 to which the single actuator multi-port variable flow control valve 100 is interfaced, and in response thereto and its programming, the electronic controller sets the flow position of each of the port bodies 1021, 1022, 1023 with respect to the valve body 108, each port body being individually set to a fluid flow position with respect to the valve body by the single actuator.

Figure 11:
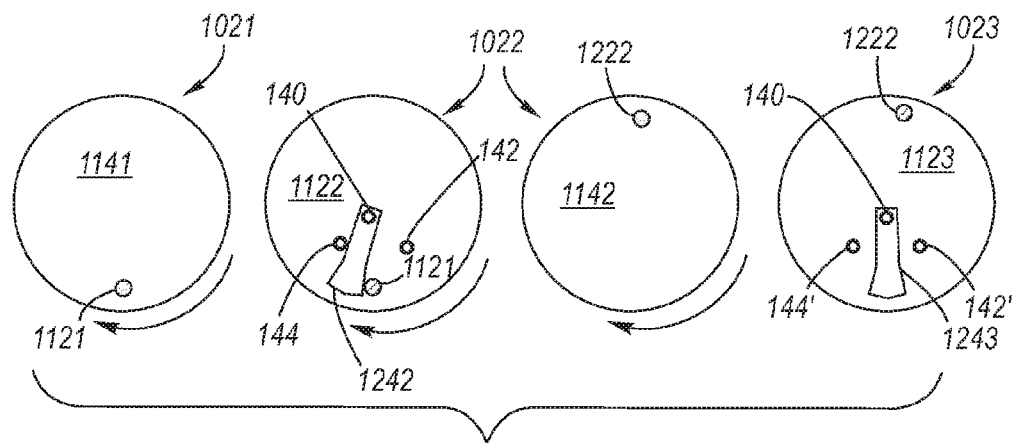

At FIG. 11, the actuator rotates the first port body 1021 clockwise at least one complete rotation, and now the second port body 1022 is rotating in unison in that the second port body driven tab 1242 is abutted by the first port body drive pin 1221 and, in turn, the second port body driven tab abuts the second port body left abutment stop 144.

Figure 12:
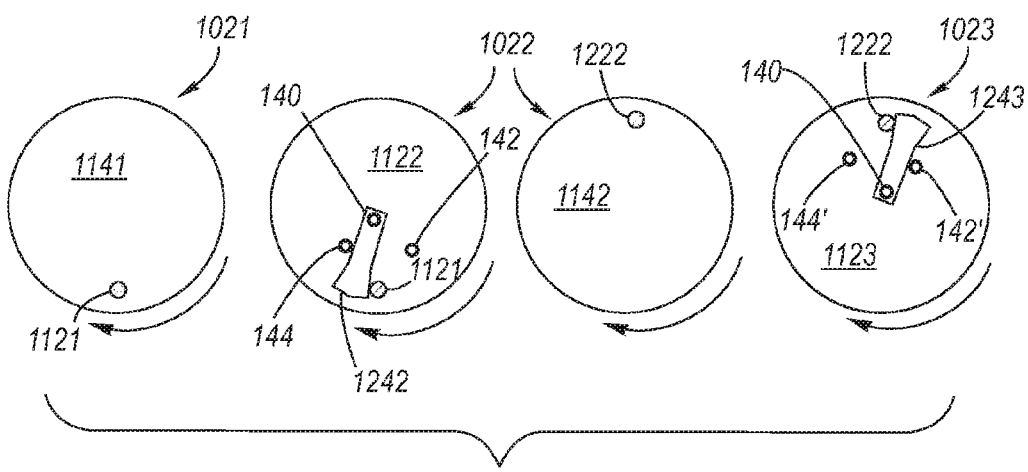

At FIG. 12 the actuator has continued to rotate the first port body 1021 one more complete rotation clockwise (two in total), which ensures that all the port bodies 1021, 1202, 1203 are rotating in unison clockwise, in that now the second port body drive pin 1222 is abutting the third port body driven tab 1243 and, in turn, the third port body driven tab is abutting the third port body left stop abutment 144'.

Figure 13:
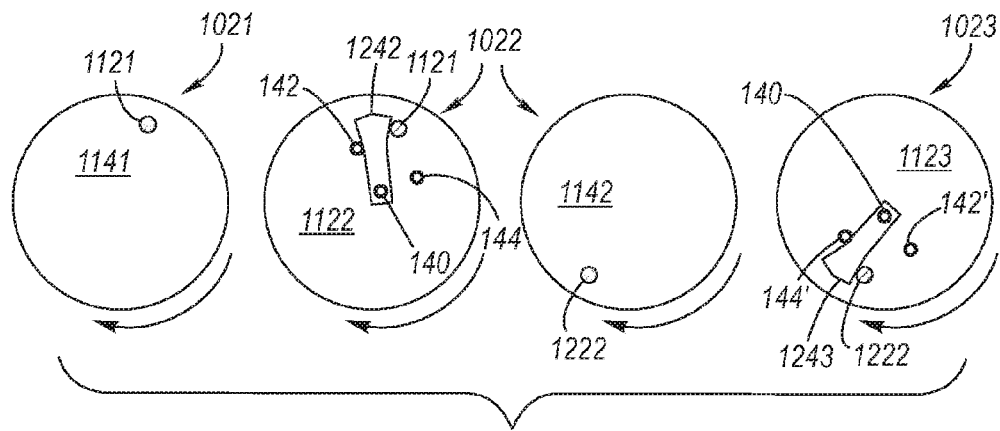

At FIG. 13, the actuator continues to rotate the first port body 1021 in the clockwise direction, whereby the drive link system 120 causes the second and third port bodies 1022, 1023 to rotate in unison with the first port body, wherein the actuator additionally rotates the first port body to set the requested angular position of the third port body.

Figure 14:
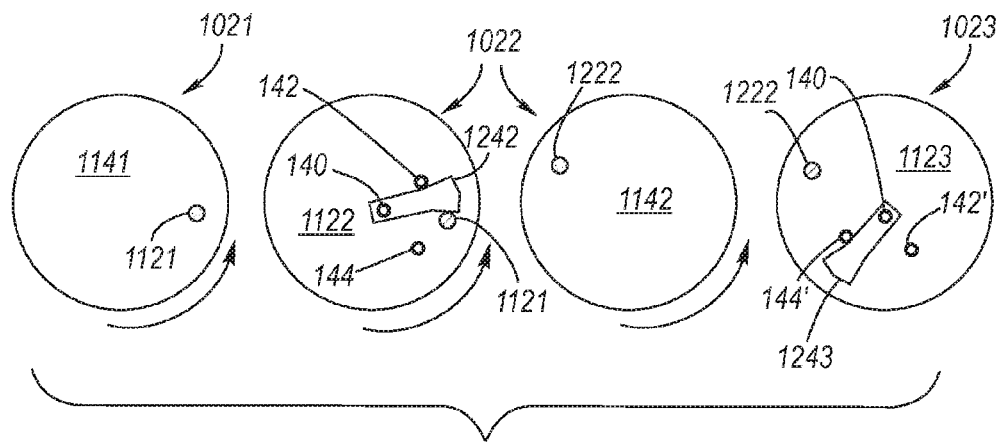

At FIG. 14, the actuator now rotates the first port body 1021 in the counterclockwise direction at least one complete rotation, which ensures that the second port body 1022 is rotating in unison with the first port body counterclockwise, in that the first port body drive pin 1221 is abutting the second port body driven tab 1242 and, in turn, the second port body driven tab abuts the second port body right stop abutment 142, wherein the third port body 1023 does not rotate. The actuator continues to rotate the first port body 1021 in the counterclockwise direction, whereby the drive link system 120 causes the second port body 1022 to rotate in unison with the first port body, wherein the actuator additionally rotates the first port body to set the requested angular position of the second port body, wherein the third port body 1023 remains stationary and set as per FIG. 13.

Figure 15:
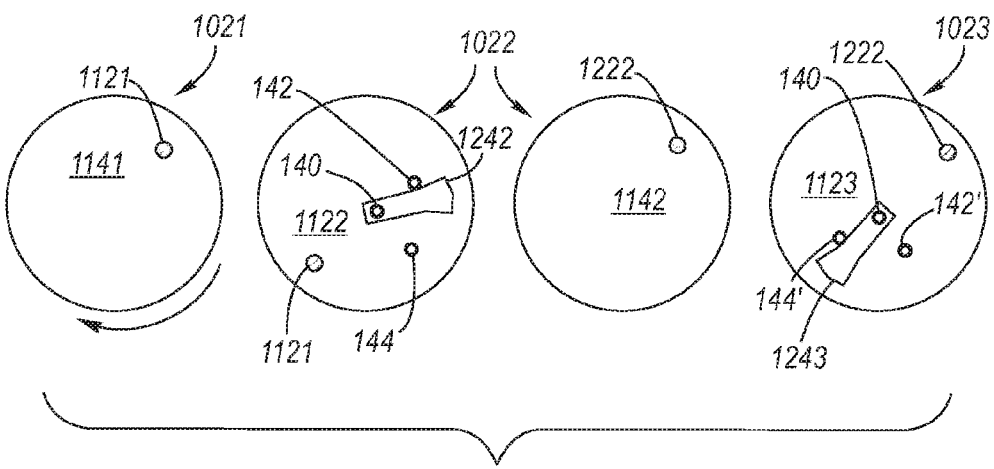

At FIG. 15, the actuator now rotates the first port body 1021 in the clockwise direction to set the requested angular position of the first port body, wherein the second and third port bodies 1022, 1023 remain stationary, and all port body angular positions have been set by the single actuator.

In accordance with the operational example above, N−1 turns of the most superior port body are needed to in order to cause turning of the most inferior port body. However, depending on the initial starting positions of the various port bodies, it is possible that less turning would be needed. For example, given the presence of a smart controller that knows the rotary position of each port body, then less rotation than N−1 turns of the most superior port body may be needed. Therefore, depending on the rotational position of the port bodies at an initial start, the rotation of the most superior port body is simply made sufficient to ensure rotation of all the port bodies occurs. Further, the rotation of the most superior port body may be less than N–1 turns because not all of the most inferior port bodies may require position adjustment.

From the foregoing, any artisan of ordinary skill can ascertain the rotational movements associated with setting any number of port bodies.

Figure 16:
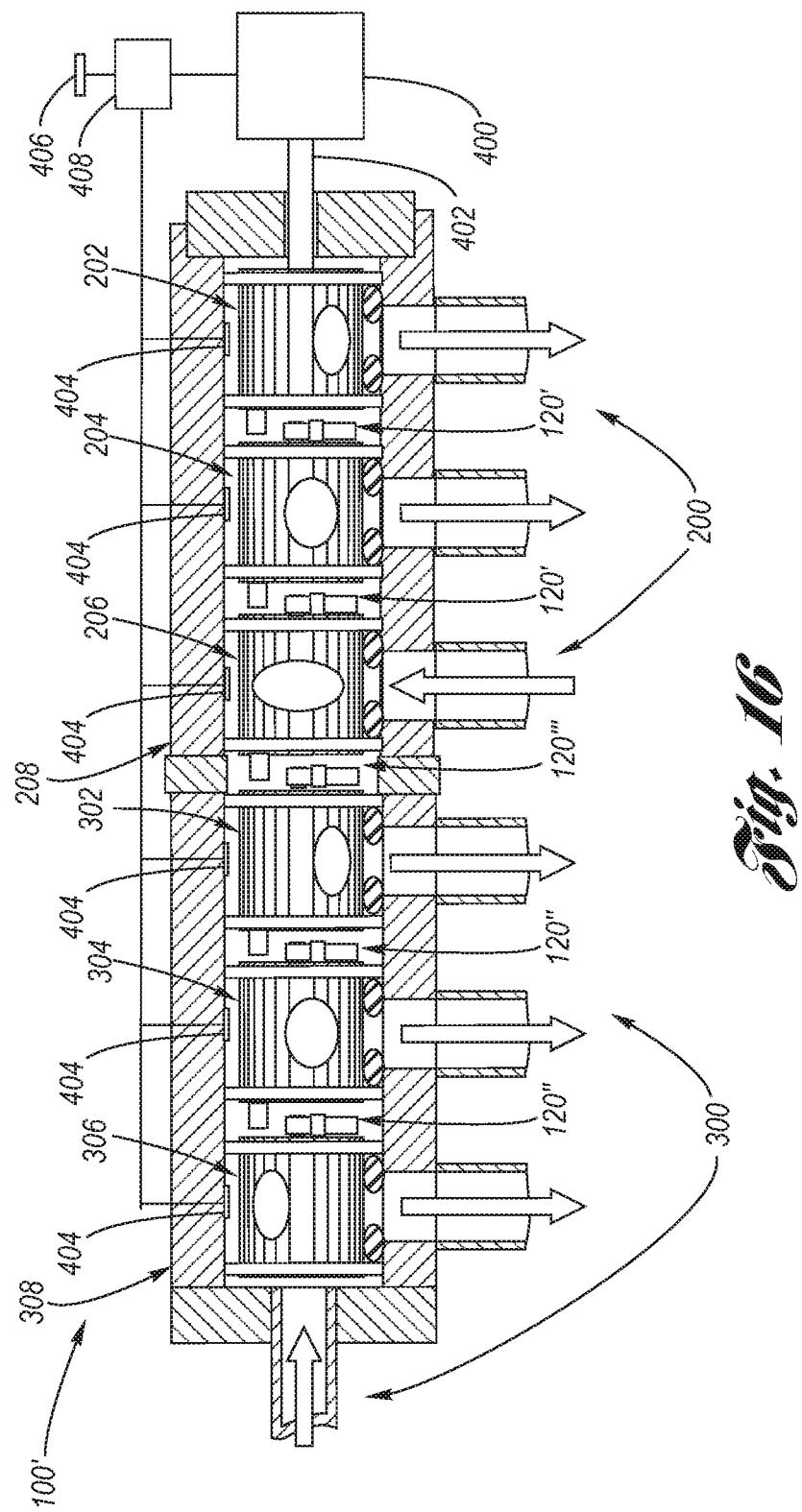
FIG. 16 is a partly sectional view of a single actuator multi-port variable flow control valve for controlling two separate fluid systems according to the present invention.

FIG. 16 depicts a schematic view of a the single actuator multi-port flow control valve 100' according to the present invention which controls fluid flow with respect to a first fluid flow system 200 and a second fluid flow system 300.

A first valve body 208 has disposed therein three port bodies 202, 204, 206, wherein the superior side wall of most superior port body 202 is connected to a single actuator 400, and the inferior side wall of the most inferior port body 206 has a shaft 402 connected thereto. A drive link system 120' is disposed between the first and second port bodies 202, 204 and between the second and third port bodies 204, 206, operating as per the drive link system 120 described above.

A second valve body 308 has disposed therein three port bodies 302, 304, 306. A drive link system 120" is disposed between the first and second port bodies 302, 304 and between the second and third port bodies 304, 306, operating as per the drive link system 120 described above.

The port bodies of the first valve body 208 are linked to the port bodies of the second valve body 308 via a drive link system 120" disposed between the third port body 206 of the first valve body 208 and the first port body 302 of the second valve body 308, operating as per the drive link system 120 described above.

When the actuator 400, preferably a stepper motor, rotates to set the angular position of the port bodies, which position may be known by position sensors 404, in response to fluid systems sensors 406 and an electronic controller 408, the rotation of the actuator proceeds in sequence as described hereinabove.

It is preferred for the drive link system to provide a full 360 degrees of rotational freedom between serially adjacent port bodies; however the rotational freedom can be greater than or less than 360 degrees.

Figure 17:
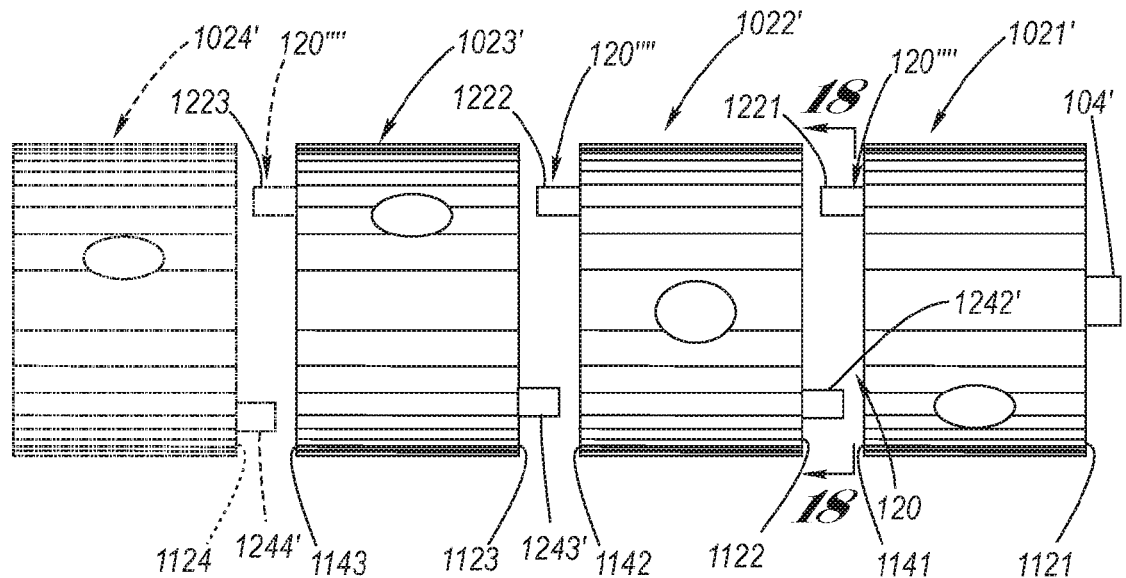
FIG. 17 is a detail side view similar to FIG. 5, wherein now the drive link system is non-pivotal.
Figure 18:
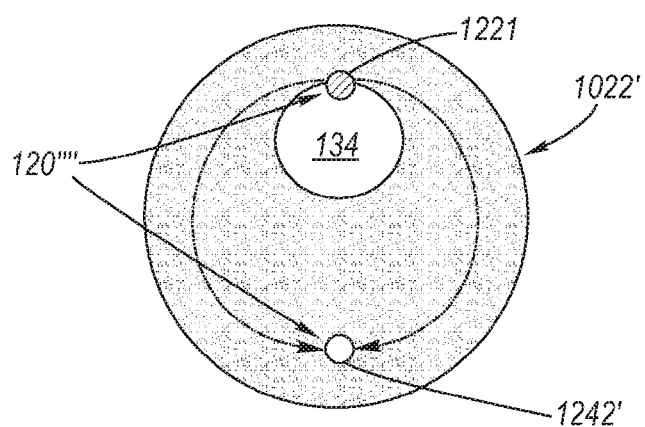
FIG. 18 is sectional view seen along line 18-18 of FIG. 17.

Referring now to FIGS. 17 and 18, a non-pivotal drive link system 120"" is depicted, wherein the views are similar to FIGS. 4 and 5, wherein like parts have like numbers. The port bodies, 1021', 1022', 1023' and 1024' are now linked via the drive link system 120"" by serial abutment of the drive pins 1221, 1222 and 1223 with respective non-pivoting driven tabs 1242', 1243' and 1244'. The driven tabs 1242', 1243' and 1244' may be optionally configured identical to the drive pins, as shown by way merely of example in FIGS. 17 and 18.

In an application where the drive link system provides less than 360 degrees of rotational freedom, as for example the application depicted at FIGS. 17 and 18, then the multi-port variable flow control valve system must have this rotational freedom constraint built into it. For example, if a drive pin at an inferior sidewall strikes a non-pivotal driven tab (or other abutting structure) allowing a rotational freedom of, say, 350 degrees, then serially iteratively less rotational freedom would be present in the queue toward the most superior port body of, wherein, in this example, the rotational freedom, RF is given by RF=360−N*10, where N is the number of port bodies in the serial queue (where the symbol "*" signifies multiplication).

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A multi-port variable flow control valve system, comprising:
 a multi-port variable flow control valve, comprising:
  a valve body having a plurality of fluid flow openings;
  a plurality of port bodies serially arranged from a most superior port body to a most inferior port body, said plurality port bodies being disposed within, and rotatably mounted with respect to, said valve body, each port body having at least one port formed therein which is selectively alignable by rotation with a respective fluid flow opening of said valve body; and
  a drive link system serially connecting said plurality of port bodies, wherein each serially superior port body selectively drives its serially inferior port body with a predetermined freedom of rotation greater than zero between driving engagement therebetween; and
 a single actuator connected to said most superior port body which selectively rotates of said plurality of port bodies via said drive link system.

2. The multi-port variable flow control valve system of claim 1, wherein each said port body has a superior side wall and an opposite inferior side wall, and wherein said drive link system comprises:
 a drive pin disposed at the inferior side wall of a superior port body; and
 a driven tab disposed at the superior side wall of a port body immediately adjacent and serially inferior to the superior port body;
 wherein each serially superior port body drives its serially inferior port body by the drive pin of the serially superior port body abutting the driven tab of the serially inferior port body.

3. The multi-port variable flow control valve system of claim 2, further comprising an electronic control system which controls actuation of rotation of said single actuator.

4. The multi-port variable flow control valve system of claim 3, further comprising:
 a fluid flow system fluidically connected with said valve body, wherein rotation of 5. The multi-port variable flow control valve system of claim 4, wherein said fluid flow system is a first fluid flow system, and said multi-port variable flow control valve is a first multiport variable flow control valve, said plurality of port bodies is a first plurality of port bodies, and said drive link system is a first drive link system; further comprising:
 a second multi-port variable flow control valve, comprising:
  a second valve body having a plurality of second fluid flow openings;
  a second plurality of serially arranged port bodies rotatably mounted within said second valve body, each port body having a port formed therein which is selectively alignable by rotation with a respective fluid flow opening of said valve body; and
  a second drive link system serially connecting said second plurality of port bodies, wherein each serially superior port body selectively drives its serially inferior port body with a predetermined freedom of rotation between driving engagement therebetween;
 a second fluid flow system fluidically connected with said second valve body, wherein rotation of said second plurality of port bodies selectively controls fluid flow in said second fluid flow system; and a third drive link system connecting a most inferior port body of said first plurality of port bodies to a most superior port body of said second plurality of port bodies;

wherein said single actuator additionally rotates said plurality of second port bodies via said first and second drive link systems.

6. The multi-port variable flow control valve of claim 5, wherein said first, second and third drive link systems comprise:

a pivot pivotally mounting a proximal end of said driven tab to the superior side wall;

a right stop abutment connected to the superior side wall; and a left stop abutment connected to the superior side wall;

wherein said right and left stop abutments are disposed in abutting relation to said driven tab such that said driven tab is pivotable between abutment with each of the right and left stop abutments and the pivoting between abutment ensures the freedom of rotation of substantially 360 degrees between driving engagement of the superior port body with respect to the serially inferior port body;

wherein for a plurality of first and second bodies equal to N, when said single actuator rotates in a first direction at most N−1 complete rotations then all said port bodies of said plurality of port bodies rotate in unison in the first direction;

wherein next when said actuator is additionally rotated in said first direction, then said most inferior port body is set to a first selected angular position with respect to said valve body;

wherein next when actuator rotates in a second direction which is opposite said first direction at most N−2 complete rotations then all said port bodies except said most inferior port body rotate in unison while said most inferior port body is rotatively stationary;

wherein when said actuator is then additionally rotated in said second direction, then the port body immediately adjacent and serially superior to said most inferior port body is set to a second selected angular position with respect to said valve body. said plurality of port bodies selectively controls fluid flow in said fluid flow system.

7. The multi-port variable flow control valve of claim 2, wherein said drive link system comprises:

a pivot pivotally mounting a proximal end of said driven tab to the superior side wall;

a right stop abutment connected to the superior side wall; and a left stop abutment connected to the superior side wall;

wherein said right and left stop abutments are disposed in abutting relation to said driven tab such that said driven tab is pivotable between abutment with each of the right and left stop abutments and the pivoting between abutment ensures the freedom of rotation of substantially 360 degrees between driving engagement of the superior port body with respect to the serially inferior port body;

wherein for a plurality of port bodies equal to N, when said single actuator rotates in a first direction at most N−1 complete rotations then all said port bodies of said plurality of port bodies rotate in unison in the first direction;

wherein next when said actuator is additionally rotated in said first direction, then said most inferior port body is set to a first selected angular position with respect to said valve body;

wherein next when actuator rotates in a second direction which is opposite said first direction at most N−2 complete rotations then all said port bodies except said most inferior port body rotate in unison while said most inferior port body is rotatively stationary;

wherein when said actuator is then additionally rotated in said second direction, then the port body immediately adjacent and serially superior to said most inferior port body is set to a second selected angular position with respect to said valve body.

8. The multi-port variable flow control valve system of claim 7, further comprising an electronic control system which controls actuation of rotation of said single actuator.

9. The multi-port variable flow control valve system of claim 8, further comprising:

a fluid flow system fluidically connected with said valve body, wherein rotation of said plurality of port bodies selectively controls fluid flow in said fluid flow system.

10. A method for controlling fluid flow, comprising the steps of:

assembling a plurality of serially arranged port bodies rotatably mounted within at least one valve body connected to at least one fluid flow system, wherein angular position of each valve body provides a selective fluid flow control of the at least one fluid flow system, wherein the plurality of port bodies comprises a number N port bodies serially arranged from a most superior port body to a most inferior port body; and selectively rotating a most superior port body of the plurality of port bodies by a single actuator such that each serially superior port body selectively drives its serially inferior port body with a predetermined freedom of rotation greater than zero therebetween to thereby set an angular position, respectively, of each said port body with respect to the at least one valve body.

11. The method of claim 10, wherein said step of selectively rotating comprises:

rotating by the single actuator the most superior port body in a first direction sufficiently such that all the port bodies are rotating in unison in the first direction;

further rotating by the single actuator the most superior port body to thereby set the most inferior port body to a first selected angular position with respect to the at least one valve body;

rotating by the single actuator the most superior port body in a second direction, opposite the first direction, sufficiently such that all the port bodies except the most inferior port body are rotating in unison in the second direction;

further rotating by the single actuator the most superior port body to thereby set the serially next to most inferior port body to a second selected angular position with respect to the at least one valve body; and serially repeating said steps of rotating and further rotating until all the port bodies have been set to their respective angular position with respect to the at least one valve body.

* * * * *